United States Patent [19]

Martineau et al.

[11] Patent Number: 5,893,910
[45] Date of Patent: *Apr. 13, 1999

[54] METHOD AND APPARATUS FOR ESTABLISHING THE LEGITIMACY OF USE OF A BLOCK OF DIGITALLY REPRESENTED INFORMATION

[75] Inventors: Pierre G. Martineau, Longueuil; Stephen P. Spackman, Montreal, both of Canada

[73] Assignee: Softguard Enterprises Inc., Brossard, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/582,736

[22] Filed: Jan. 4, 1996

[51] Int. Cl.$^6$ .................................................. G06F 17/30
[52] U.S. Cl. ........................... 707/10; 707/104; 707/9; 395/712; 380/3; 380/4
[58] Field of Search .............................. 395/601, 616, 395/609, 619, 186, 712; 326/8; 380/3, 4; 707/1, 9, 200, 203, 10, 104

[56] References Cited

U.S. PATENT DOCUMENTS

| | | | |
|---|---|---|---|
| 4,924,378 | 5/1990 | Hershey et al. | 395/187.01 |
| 5,301,231 | 4/1994 | Abraham et al. | 380/4 |
| 5,440,738 | 8/1995 | Bowman et al. | 707/6 |
| 5,483,658 | 1/1996 | Grube et al. | 395/800 |
| 5,553,143 | 9/1996 | Ross et al. | 380/25 |
| 5,761,499 | 6/1998 | Sonderegger | 707/10 |

FOREIGN PATENT DOCUMENTS

| | | |
|---|---|---|
| 0 332 304 | 9/1989 | European Pat. Off. |
| WO 93/01550 | 1/1993 | WIPO . |

OTHER PUBLICATIONS http://www.disxpress.com/laserlok.html, Diskxpress Laserlok Anti Piracy System.
http://ww.nan.shh.fi/anders/Papers/Autr92/autr2.htm, The Property of the Audit Trail section 2, 1992.
Aladdin Knowledge Systems, "Auditing, Metering, and Virus Prevention Software and Related Products" (Sep. 1995).

Primary Examiner—Paul V. Kulik
Assistant Examiner—Greta L. Robinson
Attorney, Agent, or Firm—Ratner & Prestia

[57] ABSTRACT

Method and apparatus for establishing the legitimacy of use of a block of digitally represented information residing in a computer of a user. The block of digitally represented information may be a text file, a sound recording, a graphical file or a software file. The computer includes a program that processes the selected file to generate a substantially unique identification code. The code is transmitted to a server that contains a listing of files correlated to status data, indicative of whether the file is proprietary material and the conditions associated with its use. If the server locates an entry in its database it retrieves the status data and transmits it to the user's computer. In the event the identification code issued by the user's computer is not sufficiently discriminative, i.e., it does not allow the server to uniquely identify the file, the server transmits an algorithm identifier to the user's computer allowing the file to be re-processed with a new algorithm to generate a more distinctive identification code.

15 Claims, 6 Drawing Sheets

METHOD AND APPARATUS FOR ESTABLISHING THE LEGITIMACY OF USE OF A BLOCK OF DIGITALLY REPRESENTED INFORMATION

FIELD OF THE INVENTION

This invention relates to the identification of the contents and ownership of digitally represented documents and other computer files, and the terms under which such files may be used; and the facilitation of appropriate administrative action on the basis of this information.

BACKGROUND OF THE INVENTION

Almost any kind of information can be represented digitally as a computer file. Once so represented, this information becomes extremely easy to duplicate and transmit. This can be perceived as problematic for the owners of the information, who may wish to charge copying or licensing fees for the use of the material represented.

In the case that the digital document is a piece of software, prior approaches to the problem have often depended on modifications to the operation of the software itself that check for some evidence that the terms of the license have been met. Prior approaches of more general applicability attempt to restrict access to digital documents through encryption or the imposition of access controls in the computer systems on which they are represented. These solutions share the failing that they either rely on specialized hardware or are easy to circumvent by removing the checks or re-saving the unprotected document after access has been granted. Furthermore, once these measures have been so circumvented, or if unprotected versions of documents are available from other sources, all protection for the document is lost: further unprotected versions of documents may now be duplicated and transmitted with ease. All such solutions also pose a significant inconvenience to the legitimate user of the document, since either the process of moving the document onto their system or of using it thereafter involves the extra step of establishing the right to do so, through the presentation of physical evidence of that right, and in some cases the special configuration of access management facilities.

The above difficulties and inconveniences generally arise from the presumption of an adversarial relationship between the producers and the users of digitally represented documents.

These problems are exacerbated by the fact that digital documents may be a priori hard to examine: unless their format is known, the steps that must be taken to use them are not apparent. Even when the format is known, the means to interpret it may not be available. Thus, even when digital documents are nominally self-identifying (containing embedded bibliographic and licensing information, for example), it may not be feasible to read this information. Furthermore, the format of a document may simply lack a provision for the inclusion of such identifying data. Thus, even when the receiver of a digitally represented document wishes to comply with the conditions associated with its possession or use, it may not be feasible, in the current art, to determine what these conditions are.

These several difficulties are especially pronounced when the person responsible for assuring compliance with licenses, the person responsible for acquiring digital documents, and the person using them, are distinct, as is typically the case in networked computing environments. Fortunately, in such environments there is typically no such need to assume an adversarial relationship between document producers and the person charged with assuring compliance with licenses.

Thus there is a clear need for a system that informs users of the conditions associated with the duplication or use of a digital document that does not rely on the user having specialized hardware or on the particular representation of the document or the means by which it is usually processed. It can presume upon the co-operation of its user, if not of that of all users of the computing system on which it is employed.

SUMMARY OF THE INVENTION

As embodied and broadly described herein, the invention provides a system for supplying status data relative to a block of digitally represented information (by "block of digitally represented information" is meant binary data, such text file, a graphic file, sound recording file, software file directing the computer to perform a specific task or a combination thereof) stored on a computer, said system comprising:

data processing means, including:
  a) memory means (for the purpose of this specification "memory means" is intended to designate an agency in which can be stored information. Examples include: magnetic media (hard disks, tapes, or flexible disks), optically read media (CD-ROM disks) or semiconductor memory (DRAM, SRAM, EEPROM etc.)
  b) means for receiving an identification code generated by the computer, the identification code being representative of the contents of the block of digitally represented information relative to other blocks of digital data also residing on the computer;
  c) said memory means containing a table (the expression "table" is used in a general sense to indicate an orderly arrangement of data, that creates a relationship between individual data elements) establishing a correlation between possible identification codes that said data processing means is susceptible to receive and status data associated with each identification code;
  d) means for generating either one of:
    i) status data in the event of a match between the identification code generated by the computer and an identification code stored in said table; and
    ii) data in the event of an inexact match for allowing the computer to produce a new identification code for the block of digitally represented information; and
    iii) data indicative of a no match condition between the identification code generated by the computer and an identification code stored in said table.

In a most preferred embodiment, the system can be set up to notify individual users (or system administrators in the case of networked computer environments) whether one or more files residing on the computer of a user are being utilized in a legitimate manner. The user's computer is designed to remotely interrogate the above defined system, that can be in the form of a server, to obtain licensing information about one or more files in the user's possession. That licensing information assists the user to ensure compliance with copyright laws and avoid illegal use of digitally recorded information.

The server can be viewed as a depository of file material that is susceptible to reside on the user's computer. For instance, software vendors deposit information about their products in a database administered by the server. When the user's computer issues an information request about a particular file, say a software file, the server consults the database to locate a corresponding entry. Assuming that a listing for the file exists, the information relative to the ownership and right to use is transmitted to the user's computer. It is also possible to transmit additional data that can be of commercial nature, such as information about upgrades that the vendor is making available to the public, or information about amnesty clauses allowing a delinquent user to regularize his possession of the file.

For reasons of privacy and to enhance performance of the transactions between the user's computer and the server, entire files are not exchanged. Rather, an identifier, much shorter than the volume of the actual file, is sent by the user's computer to the server. Different identifiers may used allowing to characterize the contents of the file to various levels of distinctiveness. More preferably, the identifier substantially uniquely represents the file with relation to other files residing on the user's computer. Most preferably, the identifer provides a file signature unique among all the computers that may be connected to the server. This approach is suitable if a one-step identification of the file is desired.

In a variant, a multiple step approach is implemented. In such case, an identifier having a low level of discriminability is generated first. This is done to distinguish between groups of files, say software files (programs that direct the computer to perform a certain task) and data files (on which the software files may perform operations). Once this preliminary characterization step has been completed, a new identifier is generated to provide a unique or substantially unique file signature. This could be implemented as follows. When the server has received the low level discrimination identifier, it selects a new algorithm with which the file should be re-processed to generate the unique file signature. The selection can be made by table look-up or any other similar method of selection that depends upon pre-established criteria. The server then sends to the user's computer data indicative of the algorithm to employ for re-processing the file. In a specific example, the algorithm identifer consists of two parts: (a) a fixed part from a predetermined list and (b) a sequence of parameters whose interpretation depends on the fixed part, and whose values influence the process and the result of the computation. For example the fixed part might specify the use of a Cyclic Redundancy Check (CRC) strategy; the variable part might then specify the particular irreducible polynomial to be used in the CRC according to a suitable encoding. Once the user's computer receives the algorithm data it re-processes the file with the algorithm specified by the server, generates a new identifer and sends it to the server. The above operation assumes that the user's system contains a set of algorithms among which the server can choose to direct the file identification process.

This iterative method is more elaborate than the one-step approach, however, it presents the advantage of better discrimination. More particularly, the results of the first identification pass (the identifier of low discriminability level) can be used to select the algorithm to be used for processing the file at the second identification pass that creates the unique file signature. Thus, a very specific algorithm can be used at the second stage that is known to provide good results for a particular group of files. For instance, different algorithms may work better for prose and for code; by having the first identification pass simply establish which battery of tests to apply on the next pass, overall performance could be improved.

The database of the server contains a table of file identifiers correlated to licensing information. Once the server receives a file identifer from the user's computer (generated either by the single-step or multi-step characterization process) it looks in the table to locate a corresponding entry. If an entry is found, the licensing information associated with this particular file is sent back to the user's computer.

In some instances, the file identifier generated by the user's computer may not be sufficient to fully characterize the file on which licensing data is sought. Although unlikely, it is not impossible that different files may produce the same identifier. Take the example of two software vendors selling two totally different software packages, that when processed with the algorithm used for the one-step characterization operation both generate the same identifier. The administrator of the server should in theory be aware that such a potentially ambiguous situation can occur with regard to the two particular software packages. Indeed, it is presumed that all the digitally represented material deposited with the server is tested with the algorithms that reside on the user's computers for uniqueness of the file identifiers, thus allowing the detection of conflicts. In the situation described above, when the specific file identifier is received by the server, the system is aware of the fact that it cannot determine with which software package the identifer is being associated. The problem can be resolved by requesting the user's system to issue an additional identifier, more discriminative than the first one. The same procedure described in connexion with a multi-step characterization process is followed.

Another additional notion may be involved during a file characterization process, that of inexact match. In such case an approximative matching technique is deliberately adopted to identify modified copies of a protected object (for instance text files that have been re-formatted or programme files that have had identifying marks erased or modified). Here it does not suffice to check that the file identifiers are identical; they are unlikely to be identical since the user has made modifications to the source file deposited with the server. Rather, some mathematical processing is necessary to determine which known code or codes are sufficiently similar to the code extracted from the user's data to be deemed a match. This is based on a probabilistic measure (even more so than the "substantial uniqueness" of the base technique). When using inexact match there may or may not be multiple candidate matches, and a second characterization pass may or may not be necessary—unlike the cases discussed above where the number of passes is in principle predictable in advance.

The computer of the user also contains a database in which the results of previous licensing information requests sent to the server are stored along with data indicative of the option the user has chosen relative to the licensing rights and conditions of use. This feature avoids unnecessary server requests, particularly in instances where the file system of the user's computer is unlikely to change much over time. In the event that the user wishes to establish whether a new file in his possession is proprietary material or not, he initiates a server interrogation sequence that consists of generating an identifier, sending the identifier to the server and inspecting the response. If the response is an algorithm name, a second processing pass is made to produce a new identifier. This procedure is continued until the server finds a corresponding entry in its database or declares the file to be unknown (meaning that no information relative to the file has been deposited by the owner).

Assuming that the server has a listing for the file, the licensing information is sent to the user's computer. The information is presented to the user, who is given a number of options, including:

a) informing the system that everything is in order, i.e. the user is of the view that he complies with the software licence;

b) deleting the document;

c) making the document temporarily inaccessible, pending further administrative action; and d) with the permission of the document owner regularizing the user's possession and use of the document, possibly through registration and the payment of a fee.

The choice entered by the user is recorded in his computer database so the next time the same file is questioned its status will be known. In short, the user (or the administrator of the system) needs merely to interrogate the local database to determine if a file is subjected to licensing conditions and whether the user (or system administrator) considers those conditions to be met. Requests need to be sent to the server for new files only. Note that an existing file whose contents have been modified may fall in this category.

There are instances, however, when it is desirable to issue server requests for files even when entries exists in the local database. This allows to ensure that the licensing information relative to each file is kept up to date. If this feature is desired, the computer of the user is configured to effect a global server request, for each file available in the system, at regular intervals, say every month. The entries in the local database are then overwritten and replaced with the new information issued by the server. Between global requests, the computer of the user operates as discussed earlier.

The invention might typically be used by the administrators of a time-sharing computer or a network of computers in order to perform periodic audits and legal regularization of file system contents. Its great advantages lie in:

(a) its independence of the mechanism of the manner in which digitally represented documents arrive on the computer system;

(b) its lack of reliance on special preparation or prior marking of the files to be identified;

(c) the techniques that allow file identification to take place without revealing the contents of the user's file to the server or any eavesdroppers on the communications channel to the server; and (d) its non-adversarial approach.

As embodied and broadly described herein, the invention provides a system for auditing a block of digitally represented information to determine legitimate usage of the digitally represented information, said system comprising:

data processing means;

memory means operatively connected to said data processing means, said memory means storing the block of digitally represented information;

display means operatively connected to said data processing means;

said data processing means, providing means for:

a) processing the block of digitally represented information to generate an identification code representative of the contents of the block of digitally represented information relative to other blocks of digital data also residing in said memory means;

b) transmitting said identification code to a remote computer that is capable of generating either one of status data and algorithm data;

c) said processing means being capable of processing status data received from the remote computer to generate information on said display means relative to a legitimacy of usage of the block of digitally represented information;

d) in response to algorithm data said data processing means processing the block of digitally represented information according to an algorithm correlated to said algorithm data to generate a new identification code for transmission to the remote computer.

As embodied and broadly described herein, the invention further provides a method for implementation on a computer for establishing a legitimacy of usage of a block of digitally stored information residing in a memory, said method comprising the steps of:

processing the block of digitally stored information to generate an identification code representative of the contents of the block of digitally represented information relative to other blocks of digital data also residing in said memory;

transmitting said identification code to a remote computer containing a table establishing a correlation between a plurality of identification codes and status data associated with each identification code, said status data being indicative of a legitimacy of usage of the block of digitally represented data represented by the associated identification code;

searching said table and generating either one of:

i) status data in the event of a match between the identification code generated by the computer and an identification code stored in said table; and ii) algorithm data in the event of an inexact match between the identification code generated by the computer and an identification code stored in said table for allowing the computer to produce a new identification code for the block of digitally represented information; and iii) data indicative of a no match condition between the identification code generated by the computer and an identification code stored in said table.

As embodied and broadly described herein, the invention also provides a method for auditing a block of digitally represented information to determine legitimate usage of the digitally represented information stored in a memory, said method comprising the steps of:

a) processing the block of digitally represented information to generate an identification code substantially uniquely representative of the contents of the block of digitally represented information relative to other blocks of digital data also residing in said memory means;

b) transmitting said identification code to a remote computer that is capable of generating either one of status data and algorithm data;

c) processing status data received from the remote computer to generate information on said display means relative to a legitimacy of usage of the block of digitally represented information;

d) in response to algorithm data processing the block of digitally represented information according to an algorithm correlated to said algorithm data to generate a new identification code for transmission to the remote computer.

As embodied and broadly described herein, the invention also provides a machine readable storage medium for directing a computer to perform an operation for establishing a legitimacy of usage of a block of digitally stored information residing in a memory of said computer, said storage medium comprising:

means for directing said computer to process the block of digitally stored information to generate an identification code representative of the contents of the block of digitally represented information relative to other blocks of digital data also residing in said memory;

means for directing said computer to transmit said block of digitally stored information to a remote computer containing a table establishing a correlation between a plurality identification codes and status data associated with each identification code, said status data being indicative of a legitimacy of usage of the block of digitally represented data represented by the associated identification code;

means for directing the computer for searching said table for generating either one of:
  i) status data in the event of a match between the identification code generated by the computer and an identification code stored in said table; and
  ii) algorithm data in the event of an inexact match between the identification code generated by the computer and an identification code stored in said table for allowing the computer to produce a new identification code for the block of digitally represented information; and
  iii) data indicative of a no match condition between the identification code generated by the computer and an identification code stored in said table.

As embodied and broadly described herein, the invention further provides a machine readable storage medium for directing a computer to audit a block of digitally represented information stored in a memory of said computer to determine legitimate usage of the digitally represented information, said machine readable storage medium comprising:
  a) means for directing said computer to generate an identification code representative of the contents of the block of digitally represented information relative to other blocks of digital data also residing in said memory means;
  b) means for directing said computer to transmit said identification code to a remote computer that is capable of generating either one of status data and algorithm data;
  c) means for directing said computer to process status data received from the remote computer to generate information on said display means relative to a legitimacy of usage of the block of digitally represented information;
  d) means for directing said computer to process the block of digitally represented information, in response to algorithm data received from the remote computer, according to an algorithm correlated to said algorithm data to generate a new identification code for transmission to the remote computer.

DESCRIPTION OF PREFERRED EMBODIMENTS

The invention can be presented to its users in a number of ways, including (a) as a software package that they employ on their computer, (b) as an additional capability of another software package, or (c) embedded in a portable device that is connected to their computer and/or its file system in order to perform an audit. Here we describe only the first such mode of presentation; those skilled in the art will readily perceive the manner in which it might be adapted to other modes.

Figure 1:
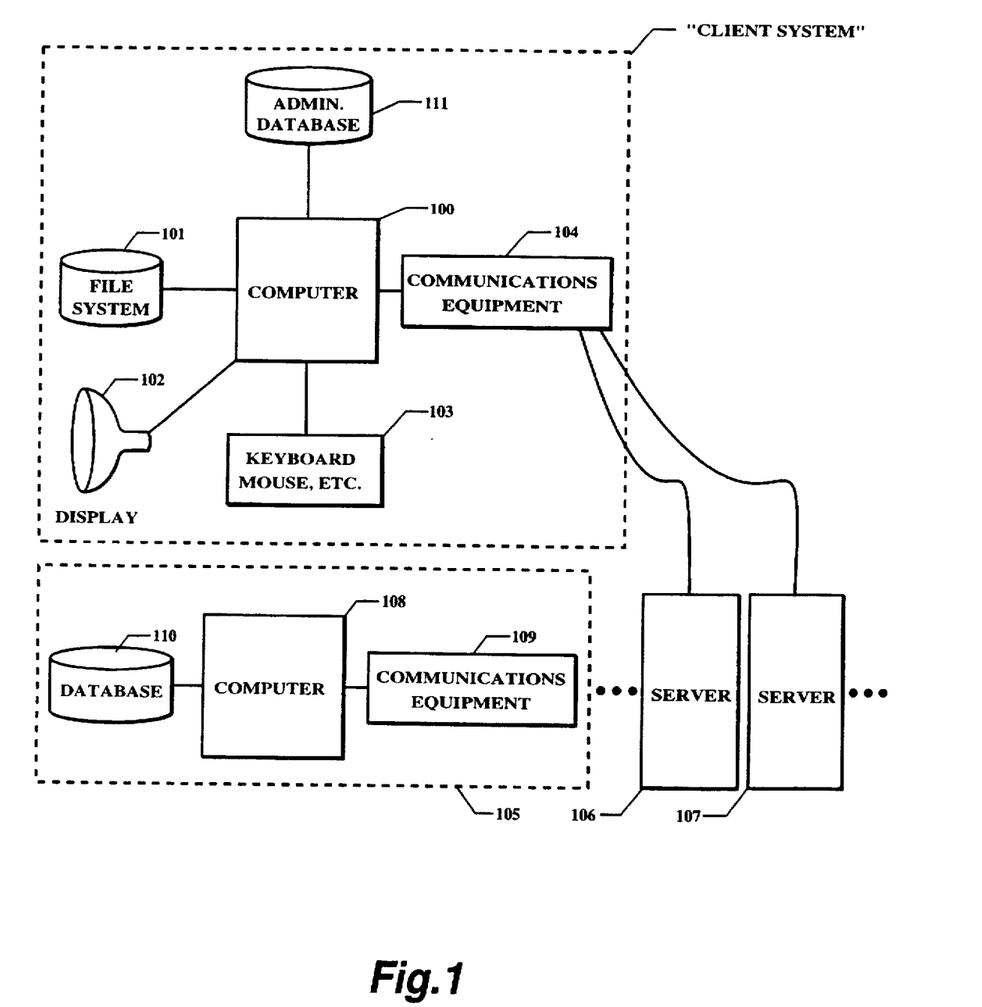
FIG. 1 is a block diagram of a system in accordance with the present invention.

FIG. 1 shows the equipment on which the present invention may be carried out. It consists of a client computer 100 connected to a file system 101 in which digitally represented documents are stored, and an administrative database 111 in which the invention stores additional information related to these documents and the policies of the client relating to the operation of the invention, as described below. The computer 100 is provided with the means of communicating with a user, in the form of a display 102 and mouse and keyboard 103, and with communications equipment 104 whereby it can exchange electronic messages with a plurality of server devices 105, 106, 107 etc. The exact physical nature of the connection between the communications equipment is immaterial and may involve telephony, satellite communication, coaxial or fibre optic cable etc., providing only that it permits digital message exchange. Each of the servers 105 etc. consists of a computer 108 connected to communications equipment 109 and a database 110 in which various information about registered documents is stored. The operation of the system is primarily controlled by software in the computers 100 and 108 in response to instructions issued by the user through the keyboard and mouse 103.

The contents of the two databases, 110 and 111, are now described. The server database 110 contains:
  a) An identification code or further signature algorithm name for each signature expected to be generated for files registered with the server;
  b) A record of any text associated with each such identification code; and
  c) An encoded description of the signature algorithm for each such signature algorithm name, including the pre-defined initial signature algorithm name, "a0".

The client's administrative database contains:
1. Entries corresponding to files in the filesystem 101, describing:
  a) Whether the file has previously been presented to the invention for identification;
  b) The result of such identification if so;
  c) Information regarding the legitimacy and terms of the client's use of the file, if known; and
  d) Such information concerning past, present or planned future action by the user of the invention, regarding the file, as may be provided by the user.

2. Records of information previously obtained from the servers 105, 106 107 etc., and as enumerated above, reducing or eliminating the necessity of repeating identical requests to the server. These records can be removed periodically without detriment to the system.

3. Entries detailing the user's administrative policy as regards the operation and use of the invention, including:

a) Descriptions of files or classes of files that for reasons of policy or security are not to be processed by the invention;

b) Descriptions of files or classes of files that are to be processed by the invention periodically and automatically; and c) Descriptions of any additional services offered by the server, such as promotional materials related to identified files, that the client wishes to receive.

d) Information related to the use of such supplemental services such as copies of orders and receipts from electronically mediated sales conducted through the medium of the invention.

3. A table of available servers and a record of their recent performance, used in selecting a server for each query.

Figure 2:
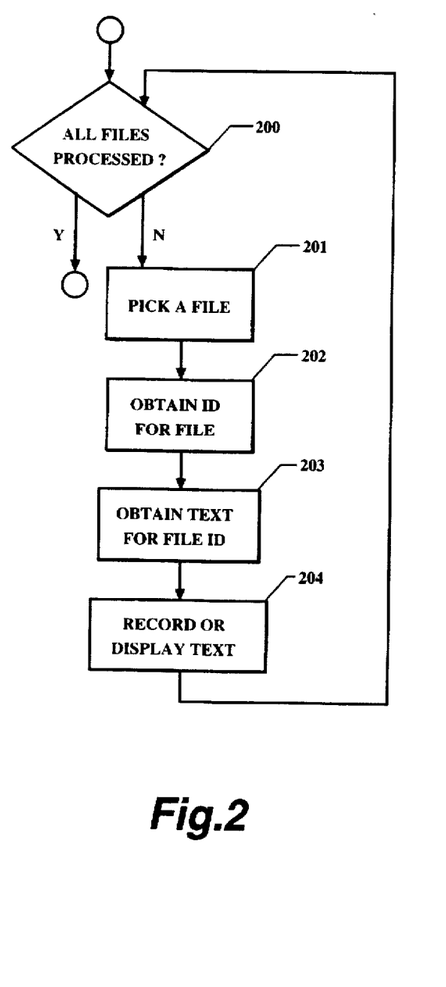
FIG. 2 is a flow chart diagramming the overall operation of the invention.

The overall operation of the invention is represented in FIG. 2. Using the mouse, keyboard 103 and display 102 the user indicates a plurality of files is that are to be processed by the invention. While 200 the number of such files remaining unprocessed is nonzero, one of them is selected 201 for processing, and its contents identified 202 relative to the server's database 110. The stored information corresponding to this identification is now obtained 203 from a server as described below, and displayed or made available for display 204 to the user. The current file is now deemed processed and control flow returns to the initial decision point 200.

Once a file has been so processed the associated information, if any, can be displayed for the user. In the display the file's name is presented along with an indication of its status, which depends on the information retrieved from the server and information previously stored in the administrative database 111. If, according to information stored in the administrative database, the file has not previously been identified by the invention, or if the identification just obtained differs from that obtained previously, its status is given as: 'OK', if the file was successfully identified and is not associated with any licensing conditions; 'PROBLEMATIC', if it was identified and a license or copying fee is required; or 'UNKNOWN' if it was not identified because the servers contain no corresponding listing. In the case that the file was deemed 'PROBLEMATIC', the user's attention is drawn to it through the use of such visible cues as a blinking indicator, red lettering, or a prominent visual icon. The user is then given the opportunity to modify the status by taking any of four further actions: 'IGNORE', which makes the visual display less prominent but does nothing else; 'DISABLE', which makes the file in question unavailable for use pending further administrative action, using whatever relevant facilities, such as encryption or access control, are available on the client system; 'DELETE', which summarily removes the file from the system; and 'DEFER', which suppresses the prominent display until a future time chosen by the user. In each case the user is provided with a comments field in which to record associated details, such as relevant license numbers and applicable corporate policies. This information, along with the reported status and the status as updated by the user, is stored in the administrative database for later reference.

An entry may be made similarly prominent for a number of other reasons, including that the document has been made obsolete by a new version (provided that this is notated in a machine readable manner in the associated record and that the user has recorded an interest in such information in the administrative database) or that it has been flagged for attention by the policy-based periodic processing enhancement described below.

Figure 3:
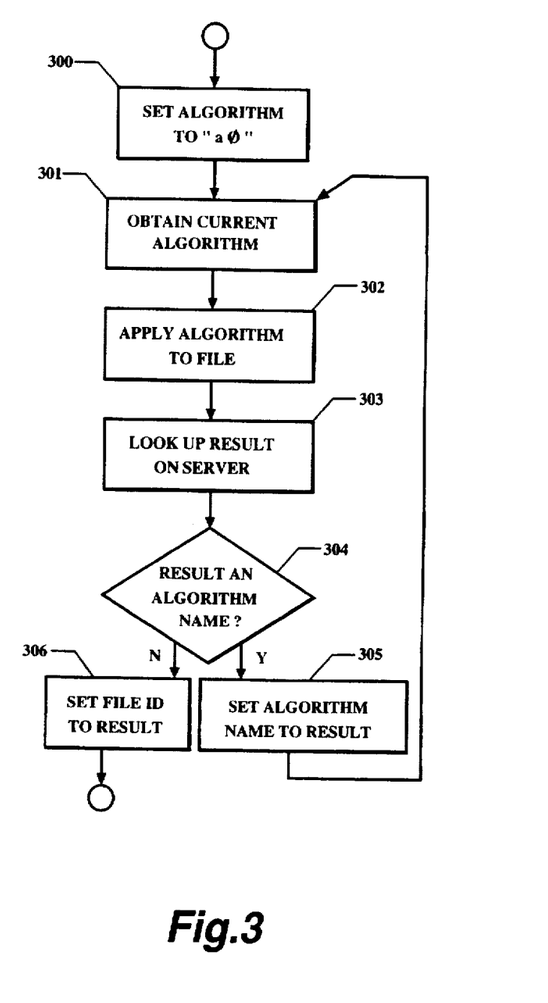
FIG. 3 is a flow chart diagramming the overall method for obtaining the identification of a stored document.

The method of obtaining a document identification 202 can be understood with reference to FIG. 3. The process relies upon the notion of a 'signature algorithm', which is a function or procedure that can be applied to a digitally represented document to obtain identifying information. Such a signature algorithm is referred to by the system either by an arbitrary short name or by a full description that uniquely identifies the function or procedure to be applied and the values of any additional parameters (other than the document being processed) upon which it depends.

When identification of a document commences, the current signature algorithm name is set 300 to a fixed value, "a0". The current signature algorithm is obtained from a server 301 on the basis of the current signature algorithm name, and then applied 302 to the digitally represented document being processed. The resulting value is a 'signature' for the document which is unconditionally looked up on the server 303 as described below. The result obtained is either the name of a signature algorithm, a document identification code, or a failure notification. If 304 it is a signature algorithm name this becomes 305 the current signature algorithm name and the flow of control returns to the step 301 in which the signature algorithm itself is obtained from a server. Otherwise 306 the document identification code or failure notification just returned is the value desired. Processing thus iterates through the steps above until a unique identification is obtained for the file, or it is determined that the file is not known to the server.

Obtaining information from a server

Figure 4:
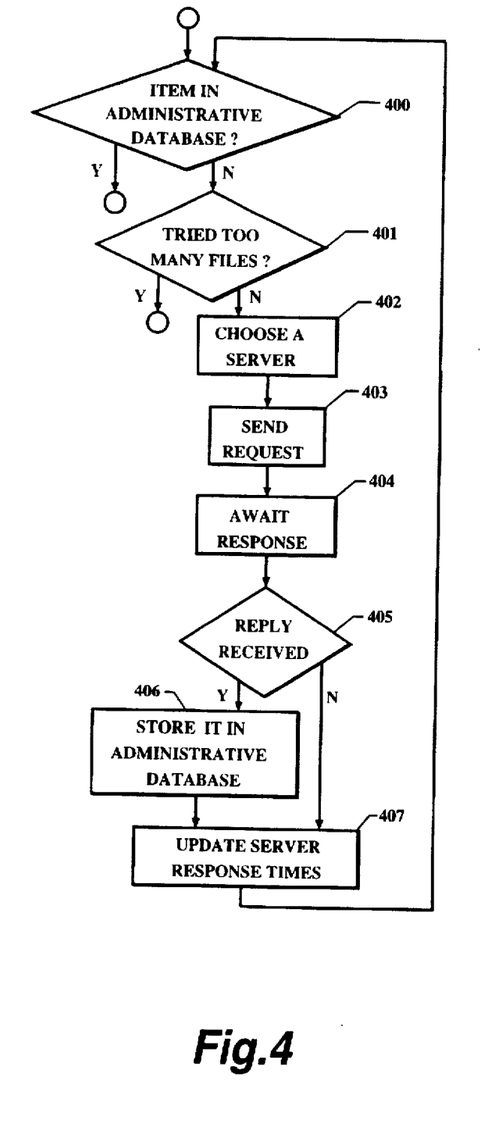
FIG. 4 is a flow chart diagramming the method for obtaining information from a server.

When in the above method information has to be obtained from a server, it is done by sending a request via the communications equipment 104 and awaiting a reply. This is now described in more detail. The way in which the reply is produced by the server is described in a later section.

Referring to FIG. 4, obtaining information from a server starts with a check 400 to see if the information required has already been retrieved and saved in the administrative database 111. If so, no further action is required. Otherwise a test is made 401 to see if too many unsuccessful attempts have been made to retrieve this item from a server. If so, the attempt to obtain information is deemed to have failed. Otherwise, a list of available servers 105 106 107 etc. stored in the administrative database 111 is consulted. A server is selected at random from among the entries therein, giving statistical preference to hitherto unused servers and servers that have produced responses rapidly in recent requests 402; this selection method serves to improve overall performance of the invention in the face of changing load and external circumstances. The fact that the server selection is random is of no consequence since by design each server makes the same reply to any given query. The request is sent to the server 403 and a reply is awaited 404; when the response arrives or a maximum allowed time elapses from the moment that the request was sent, processing proceeds. If 405 the anticipated reply has indeed arrived it is stored 406 in the administrative database 111 whence it can be retrieved later. In either case the delay from the sending of the request to the reception of the reply is computed and used to update 407 the performance measure of the selected server in the list of servers available. The flow of control then returns to the top of the loop with the test 400 for whether the information is yet in the administrative database.

Where information is to be unconditionally retrieved from the server, processing proceeds by first removing any pre-existing entry for the required item from the administrative database, and then continuing as above. This ensures that data obtained are completely current.

Because of the way the above logic is designed, the system may conserve database space by arbitrarily deleting entries, typically old or unused ones, at the start or end of any session. If they are needed again the test for presence 400 will ensure that they are re-obtained from a server as appropriate.

Signature algorithms

The signatures by means of which the identities of digitally presented documents are determined are arbitrary codes of bounded length computed from the documents according to pre-specified algorithms or parametric classes of such algorithms. The invention does not depend on the particular method by which signatures are extracted from documents. A number of techniques are known to the art, including but not limited to the following:

a) Generalized checksumming, whereby a signature is a pseudo-random function of the entire input document. If desired, so-called cryptographic checksumming can be employed, which has the mathematical property that it is hard to contrive a document with a particular given checksum (though it remains relatively easy to find the checksum of a given document). The generalized checksumming method has the advantage that it simplifies the server, since the information associated with a document can be obtained directly by looking up its checksum in a stored table. It has however the property, a disadvantage in some applications, that minor changes in the document change the checksum unpredictably, rendering modified documents unidentifiable. The variant using cryptographic checksumming however has the property that it is extremely hard to construct documents that will be consistently misidentified by the invention, which may be an advantage in some applications.

b) Signature generation based on pre-specified keys. The signature of a document can be based on the identification of certain key phrases or sequences within the document. These keys can then be reduced to digital codes by table look-up, checksumming, or other suitable method; the resulting codes are then combined by a mathematical function chosen to reflect the desired relationship between the keys. For example, simple functions exist for the case where a document is considered to have been identified when all of a given list of keys have been located, and similarly where locating any of them suffices. More complex criteria are also possible. This approach has the advantage that it allows more control over when a document is considered to have been identified. It also allows the identification of all documents containing certain specified passages or components (such as linked software libraries). It has the disadvantage that 'collisions' between documents, by which two documents generate non-distinguishable signatures, are more likely: since less of the document is involved in the generation of a signature, more documents will generate the same signature. This technique can also exploit (but does not require) special preparation of documents by the insertion of identifying tags.

c) If the function that combines the numbers derived from identified keys in technique (b) is modified to tolerate a certain amount of "noise" from spuriously identified keys, and if key numbers are derived by checksumming or other method that does not rely on providing an explicit list of possible keys to the client, it is possible to use statistical methods to locate keys within the document. The server must now use a more complex matching procedure when locating the data associated with a signature to account for the contribution of incorrectly identified keys to the signature. This technique has the advantage that key identification can be made faster and less storage-intensive than method (2) at the cost of increased processing load at the server.

d) Multistage identification can be used, in which a signature is first derived using only information conventionally used to designate the "type" or format of a document. This can typically be done using conventional finite-state techniques to examine the document representation. Since this does nothing to identify the particular document in question, the server responds with a specification for a new identification technique that is specialized to the type in question. This can be used to select between the various approaches described above, for instance, or to choose between different possible sets of keys for techniques (b) or (c). This technique is very cheap in itself, and though it does not result directly in an identification of the document being examined, it has the advantage of increasing the efficiency and precision of the subsequent identification step. The type information it produces may also be useful to the client in its own right.

Signature algorithms can furthermore be modified to systematically ignore certain information in a document, either as an efficiency measure or because it is unessential to the identity of the document in the sense appropriate to the particular application of the invention, as for instance formatting information stored within a text file.

The document signature as used by the invention includes not only the value directly computed but the name of the signature algorithm itself so that the results of different signature algorithms can readily be distinguished. Proper choice of signature names also helps distinguish signatures from document identification is codes, algorithm names, and other such identifiers used in the invention.

The overall technique relies on the fact that, because each signature is at least potentially derived by examination of the entire document, it is unlikely —though not impossible—for two documents to produce the same result when subjected to the tests performed on them by the client software. Because the tests themselves are typically prepared in full knowledge of the complete list of registered documents and of the approximate number of other, unregistered, documents that may be encountered, well-known algebraic, statistical and cryptographic techniques can be used to adjust the likelihood of such 'collisions' to a level appropriate to any given application of the invention, with higher reliability requiring longer signatures or more exchanges between client and server.

The various possible signature techniques can be divided into two categories, namely 'exact match' and 'inexact match' signatures, depending on whether they are applicable only to the detection of perfect identity between two documents or whether they are also tolerant of a limited amount of modification of the documents being processed. The advantage of exact match techniques is that they generally permit smaller signatures for the same level of required reliability, and, since all possible responses that are deemed to be matches are known in advance, they permit server processing to be reduced to simple database lookup. Inexact match signatures require some processing on the server to determine the full list of possibly modified documents to which they possibly correspond relative to some suitably chosen partial match criteria or probability threshold. Thus, unlike exact match techniques, the composition of this list of candidates cannot feasibly be fully determined in advance but must be computed when a query is received.

Processing on the server

Figure 5:
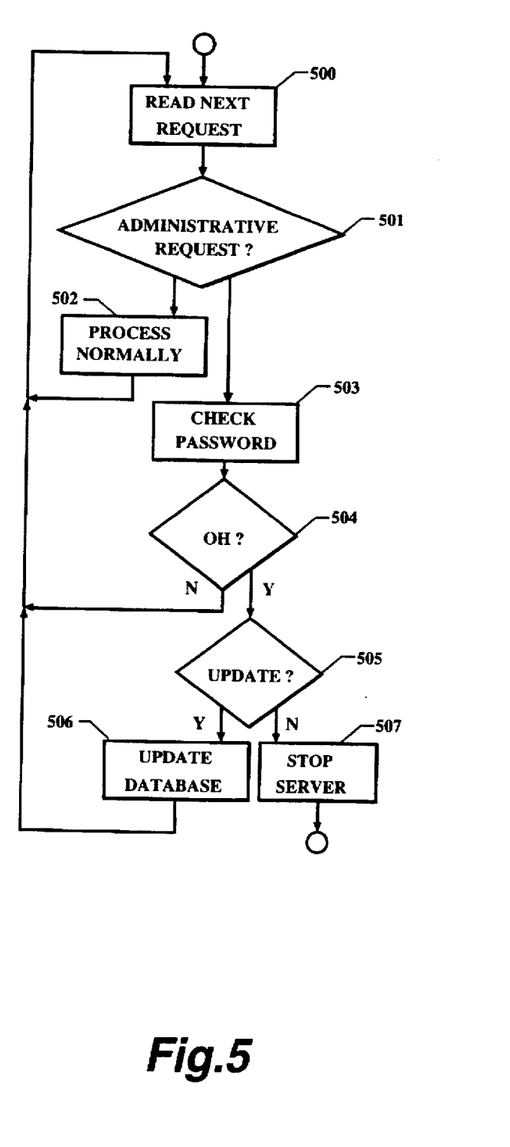
FIG. 5 is a flow chart diagramming the overall operation of a server.

The server 105 contains a computer 108 which executes an algorithm that can be understood with reference to FIG. 5. At each step the computer reads a request 501 from the attached communications equipment 109, noting the client system from which it originates so that a proper reply may be made. If 501 the request is not an administrative request, it relates to the routine operation of the invention and is processed 502 as described in the next paragraph. Otherwise the origin of the request and a password field within it serving to identify the maintainers of the server are examined 503; if they are incorrect, the request is silently ignored and the flow of control returns for the reception of the next request 500. Otherwise, if 505 the request is a request to update the database, the modification is performed 506 and the flow of control similarly returns to the top of the loop 500. Otherwise the request is a request for the server to shut down 507 and the algorithm terminates; additional software outside the scope of the present invention then presumably provides for system maintenance to take place.

For all cases of retrieval from the server except the interpretation of inexact-match signatures, server processing of a regular client request is trivial: the incoming query is looked up directly in database 110, and the result, whether successful or not, is returned as the response. This is possible because for exact match of known documents and for the interpretation of names given out by the server itself, the correct response is always known in advance. In the event that the request is for identification of a document, such a stored response may be either a document identification code or a signature algorithm name, since it a signature does not necessarily identify a document uniquely. In the latter case it will generally be possible to specify an algorithm in the stored response that has been previously determined to be able distinguish between the various remaining candidates.

Figure 6:
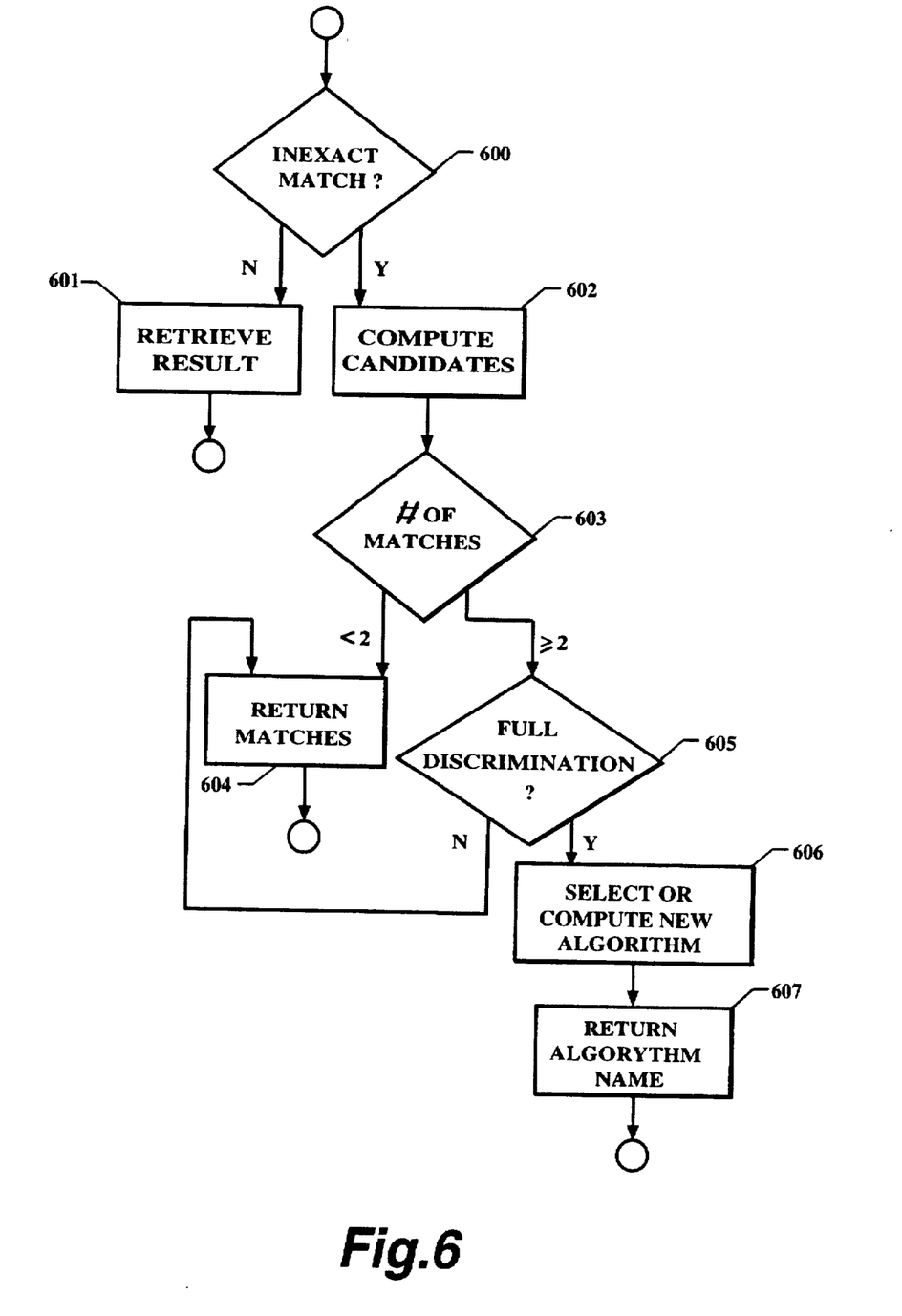
FIG. 6 is a flow chart diagramming the method by which a server processes each client request.

In the case of an inexact-match signature, additional processing is required on the server. Referring to FIG. 6, if 600 a request is not for an inexact-match signature, it can be processed directly as just described 601. Otherwise, those entries in the database that may correspond to such signatures are scanned 602 for matches relative to suitable pre-established partial match criteria or probability threshold, as appropriate to the particular signature algorithm. The experienced practitioner of the art will note that a number of widely known pre-computation techniques will serve to improve the efficiency of this step. If 603 the number of such matches found is less than two, the results of the scan can be returned as the result of the query 604. Similarly, if 605 unambiguous identification of documents is not required, the list of candidate matches can be returned as the result of the query 604. If, however, further discrimination is required, a further signature algorithm is selected or computed that can with reasonable probability distinguish the members of the candidate set 606, and its name is returned as the result 607. If information about the candidate set is suitably encoded in the name, the algorithm so selected need only be able to discriminate between these candidates, permitting more precise inexact match tests to be used than are typically appropriate to the initial signature, such as checking for the presence of one or more particular sequences of information that are known to appear in some but not all of the candidates.

As already described, the client, upon receiving a signature algorithm name, will employ it iteratively in a further attempt to establish the identity of the document then being processed.

Enhancement automatically applying a stored policy

This section describes the operation of an enhancement to the client software allowing a pre-specified policy to be applied by the computer 100 in order to bring files with new or changed status to the user's attention. It operates as follows. The computer 100 stores in administrative database 111 a policy, chosen by the user, describing the attributes of files (such as type, age, form of name, time since last modification, or other administrative information stored by the file system) which are to receive attention. Periodically, at fixed times or at the user's direction, the file system 101 is processed as detailed in FIG. 7. While 700 any files are still unconsidered, one of them is selected 701 for processing. If, 702, considering such attributes as its name, type, age and history it is not included within the scope of the stored policy it is deemed processed and program flow returns to test 700. Otherwise, the file is identified 703 as previously described and detailed in FIG. 6. If 704 the identification of the file has changed from the value stored in the administrative database 111 or if there was no previous entry for the file therein, the identification is updated 705 to the new value in the administrative database and is flagged there 706 as possibly requiring human attention. The file is now deemed processed, and control flow returns to the head of the loop 700. If available on the user's computer, a means such as electronic mail of leaving a message for the user may also be employed to report the full list of files with changed status directly to the user.

Figure 7:
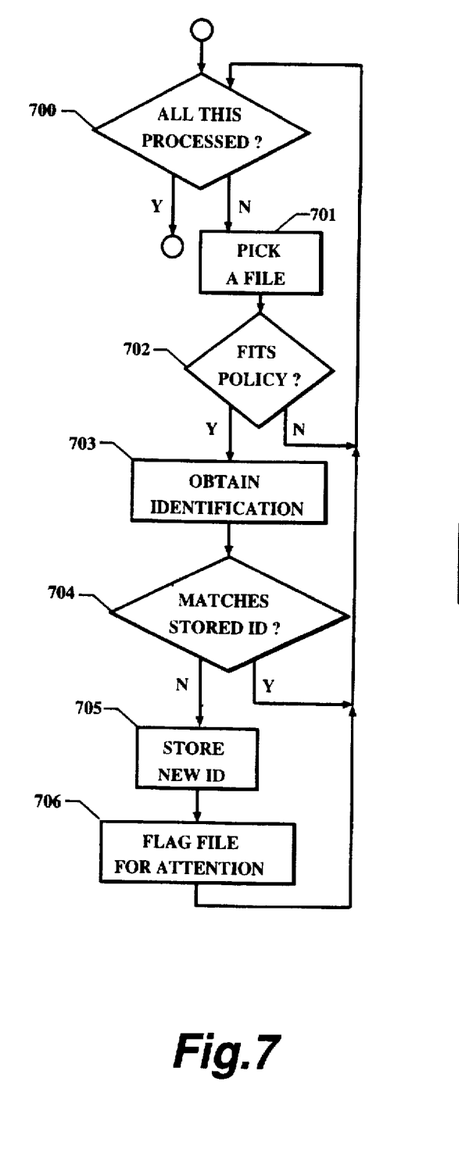
FIG. 7 is a flow chart depicting an enhancement to the system for alerting the user to changes in document status on the basis of a stored policy.

When the program presents the list of files on the file system to the user as previously described, those files with changed identification are drawn to the user's attention by graphic means, such as the use of colour or annotations in the display. A means is furthermore provided whereby the user can locate each flagged file directly: a keystroke or menu item is provided that adjusts the screen display so that each successive flagged item is made prominent.

The flags in the administrative database as used by this enhancement are reset when the user makes changes to the stored entry in the manner described previously.

The maintainer of the servers 105 etc. can make use of this enhancement to draw the user's attention to particular files by changing the identity code associated with it in the server database 110.

Enhancement for grouping of related documents

Because digital documents are often licensed and distributed in related sets, it may be advantageous to allow identified documents to be associated with abstract umbrella entities that are not themselves documents. This can be accomplished by the optional inclusion of a document group code in the information associated with a document in the server database. When this information is retrieved in the identification of a file, the presence of the code is noted by the client software. Documents with the same such code are then marked as related when the results are presented to the user. The administrative actions associated with 'PROBLEMATIC' items are extended to allow entire groups to be manipulated at once. To improve efficiency and eliminate redundancy, a textual record is also associated with each group code and made available for retrieval and display in the same manner as the information associated with a document identification. This has the further benefit that general information about a product independent of a particular version can be centralized and made available by this method.

Enhancement for direct sale of goods and services

At the request of the document owner, subject to configuration information stored in the administrative database 111, and in accordance with supplementary information contained in the record retrieved from the server, additional administrative actions are offered to the user when a document entry is displayed, in the form of goods and services for sale. Each such available good or service is identified internally by a unique code. These goods and services include, at the document owner's option, sale of a license to use the document identified, sale of such a license backdated to or before the apparent installation date of the document, sale of upgraded versions of the document where these exist, and sale of technical support services for the document or related documents. In the event that such an action is elected by the user, the order is sent to the server and a receipt obtained in a manner that can be understood with reference to FIG. 8.

Figure 8:
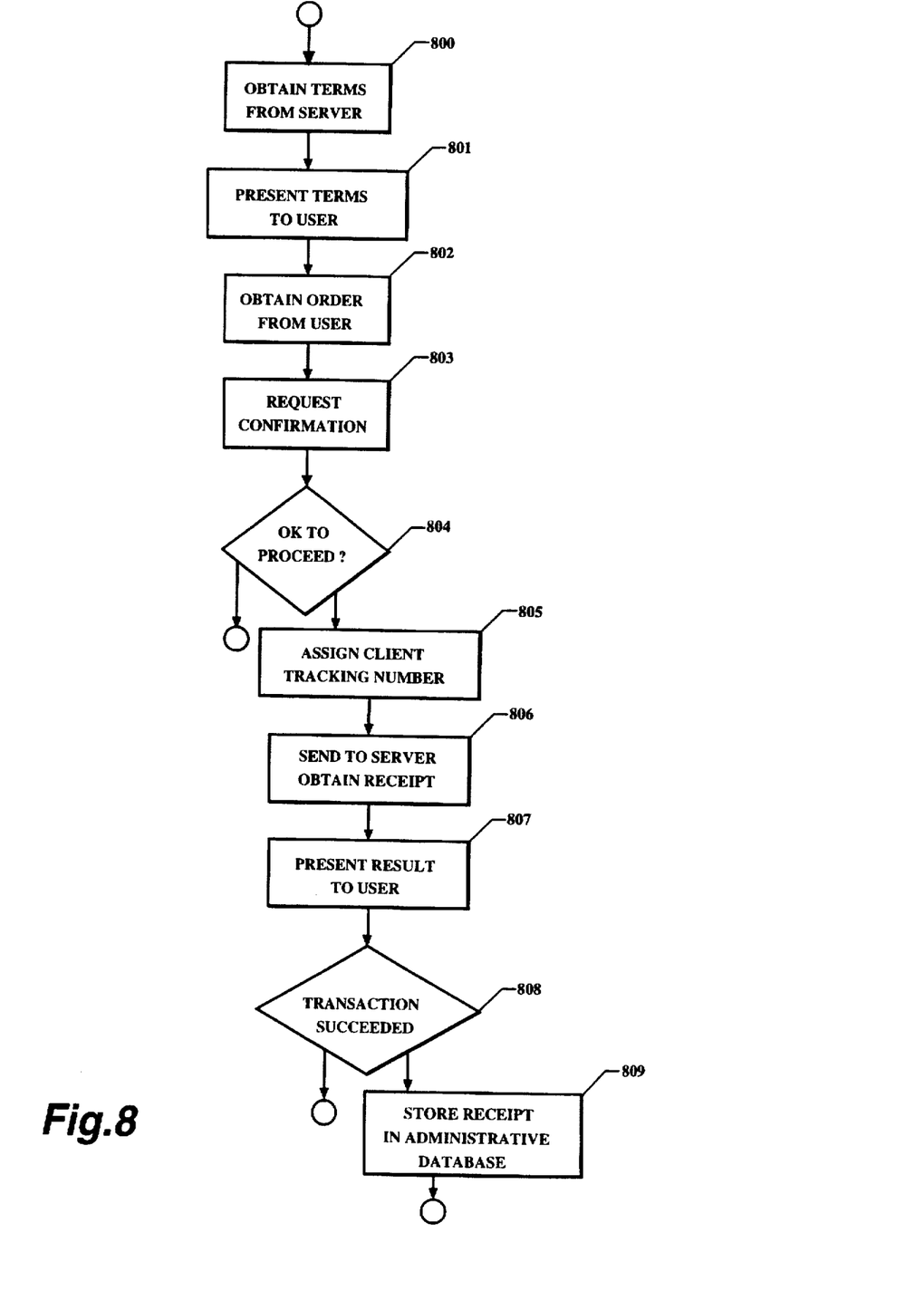
FIG. 8 is a flow chart diagramming a method of offering goods and services for sale on the basis of information provided by the invention.

The client program on receipt of the user's request to purchase a good or service sends the associated identifying code to a server and obtains a reply giving the details of the item offered, the terms of purchase, and specifying any required information that must be provided by the user 800. These data are presented to the user 801 who is provided with means to enter such required information 802. The user is asked to confirm the order 803 and if 804 the order is confirmed the client computer assigns the order a client-side tracking number 805 and sends the order to a server 806, receiving a receipt or a notification of failure in exchange, which is presented to the user 807 for examination. If 808 the transaction was successful the receipt is stored 809 in the administrative database 111 for future reference.

Figure 9:
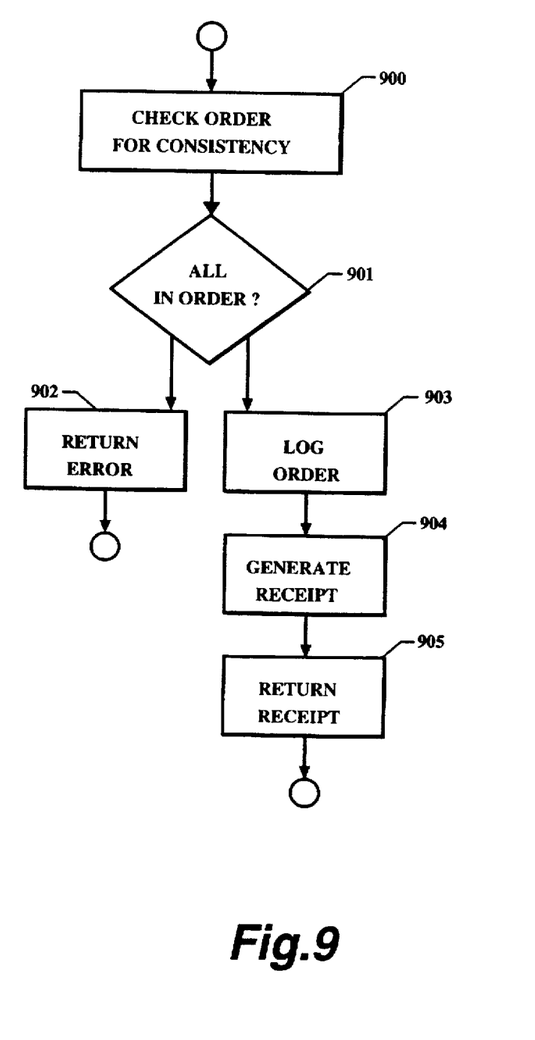
FIG. 9 is a flow chart diagramming the processing technique for making and recording such sales.

The first server involvement in making a sale, that of returning the terms of sale, proceeds as the retrieval of any other direct retrieval of information and requires no special handling. Processing of the order itself can be understood with reference to FIG. 9. The incoming order is checked for consistency and completeness 900. If 901 there is a problem, an error is returned 902 to the client system. Otherwise everything is in order, the order is logged 903 and a serialized receipt is generated 904 and returned 905 to the user. Logged orders are periodically collected from the various servers and correlated at a sales centre; duplicate orders arising from communications problems between clients and servers can be detected and suppressed at this time because they will originate from the same client system and cite the same client-side tracking number.

The method by which payment is made may be electronic and may be integrated with the client software system, but its details are outside the scope of this invention. The experienced practitioner will be able to identify several suitable techniques in the present art. In the event that an electronic payment method is employed, and the server can rapidly ensure that the funds transfer has cleared, the associated protocol should be integrated into the ordering method just described in a manner appropriate to such protocol, and the receipt obtained from the server may, at the seller's option, contain any reference numbers, license numbers, passwords, access codes or instructions required to directly obtain goods or access to services so purchased.

Preparation of materials for server

In order to minimise the number of exchanges required between the client and server systems to arrive at an unambiguous identification of a file, it is desirable that the signature algorithm produce a unique result for each document listed in the server. In general, for exact match signature techniques, this can be assured statistically by choosing a signature algorithm whose output is uniformly distributed over a space well in excess of the square of the number of distinct documents that must be recognized. In the unlikely event that collisions should occur, this will be detected in the course of the preparation of the server database. Either the signature algorithm being employed can be changed until one is found that has no such problem, or the server database can be arranged to return a further, preselected, discrimination algorithm name, as described. This requires no additional computation in the server while processing a client request and no change to the server logic, since the problem can be detected and the discriminating algorithm selected when the conflicting database entry is made. The choice of such a secondary signature algorithm is almost arbitrary, since the only requirement is that it produce different results for items that actually conflict on the initial signature.

The situation is more complex in the case of inexact match signatures since, as already been noted, it cannot be known in advance which ambiguities will occur when signatures are generated from modified documents. The parameters of inexact match signature algorithms can, however, still be selected so as to minimise the probability of ambiguity, if this is appropriate. For example, choices of algorithm parameters with the property that evidence for the signature matching one document is consistently also interpreted as evidence for another document can be avoided at the time the server database is prepared.

As an optimisation it may be appropriate also to perform the preprocessing just described for exact-match signatures in the inexact-match case. This will improve performance if unmodified documents are common, while still allowing modified documents to be recognised.

Multi-stage discrimination requires a different approach to preparing the server database, since in this case it is desired to produce an initial discrimination that is highly ambiguous with respect to the particular documents identified, since only their formats are distinguished at first. In this case the initial signature algorithm will typically be a discrimination algorithm for the document formats considered, prepared from descriptions of the various possible formats by standard techniques. The comments above then apply to the second and subsequent phases of the discrimination process.

Collection of statistical data

In many applications it is desirable to extend the function of the servers so that they collect statistical information about the signatures submitted. These data can be used to develop estimates of distribution patterns of digitally represented documents. The information so collected is not, however, totally reliable, since it is possible for more than one document to yield the same signature when analyzed with the techniques here presented, notwithstanding the technique presented in the last section which ensures that such collisions do not happen between any two documents that are processed by unambiguous signature and that are both listed with the servers. In the present application of the invention this is in fact desirable, since it is arguably not to the advantage of a user of the system for any outside agency, including the operator of the invention, to acquire any certain knowledge about the documents residing in the user's file system.

The above description of the preferred embodiment should not be interpreted in any limiting manner since is refinements are possible without departing from the spirit of the invention. The scope of the application is defined in the appended claims and their equivalents.

I claim:

1. A server system for supplying status data relative to a block of digitally represented information stored on a client computer, said system comprising:
   data processing means, including:
   a) memory means;
   b) means for receiving an identification code generated by the computer, the identification code being representative of the contents of the block of digitally represented information relative to other blocks of digital data also residing on the client computer;
   c) said memory means containing a table establishing a correlation between possible identification codes that said data processing means is susceptible to receive and status data associated with each identification code;
   d) means for generating:
      i) status data in the event of a match between the identification code generated by the client computer and an identification code stored in said table;
      ii) data in the event of an inexact match for allowing the client computer to produce a new identification code for the block of digitally represented information;
      iii) data indicative of a no match condition in the event of no match between the identification code generated by the client computer and an identification code stored in said table.

2. A system as defined in claim 1, wherein said status data indicates that the block of digitally represented information is proprietary.

3. A system as defined in claim 1, wherein said data allowing the client computer to produce a new identification code for the block of digitally represented information is indicative of a predetermined algorithm to process the block of digitally represented information.

4. A system as defined in claim 1, comprising a list of algorithm identifiers stored in said memory, the algorithms pointed to by said list of identifiers being capable of processing the block of digitally represented information to produce an identification code.

5. A system as defined in claim 4, further comprising means for selecting a particular algorithm identifier in said list and transmitting the selected list identifier to the client computer.

6. A system as defined in claim 1, further comprising means for transmitting with said status data, promotional data relative to the block of digitally represented information.

7. A client system for auditing a block of digitally represented information to determine the legitimate usage of the digitally represented information, said client system comprising:
   data processing means;
   memory means operatively connected to said data processing means, said memory means storing the block of digitally represented information;
   display means operatively connected to said data processing means;
   said data processing means providing means for:
   a) processing the block of digitally represented information to generate an identification code representative of the contents of the block of digitally represented information relative to other blocks of digital data also residing in said memory means;
   b) transmitting said identification code to a remote server computer that is capable of generating either one of status data and algorithm data;
   c) said processing means being capable of processing status data received from the remote server computer to generate information on said display means relative to a legitimacy of usage of the block of digitally represented information;
   d) in response to algorithm data said data processing means processing the block of digitally represented information according to an algorithm correlated to said algorithm data to generate a new identification code for transmission to the remote server computer.

8. A system as defined in claim 7, comprising user input means in operative relationship with said data processing means for transmitting data to said data processing means indicative of a legitimacy of usage of a certain block of digitally represented information.

9. A system as defined in claim 8, wherein said memory means includes a table establishing a correlation between blocks of digitally represented information residing in said memory means and data indicative of legitimacy of usage of each said block of digitally represented information.

10. A system as defined in claim 9, wherein said data processing means being capable of searching said table in response to status data received from the remote server computer for an entry corresponding to the identification code transmitted to the remote server computer prior to issuance of the status data, if an entry is located that matches the identification code said data processing means retrieving and displaying on said display means the data indicative of the legitimacy of usage of the block of digitally represented information.

11. A system as defined in claim 10, wherein said data processing means being capable of searching said table in response to status data received from the remote server computer for an entry corresponding to the identification code transmitted to the remote server computer prior to issuance of the status data, if no entry is located that matches the identification code said data processing means displaying legitimacy of usage embedded in the status data.

12. A method for implementation on a client computer for establishing a legitimacy of usage of a block of digitally stored information residing in a memory, said method comprising the steps of:
   processing the block of digitally stored information to generate an identification code representative of the contents of the block of digitally represented information relative to other blocks of digital data also residing in said memory;
   transmitting said identification code to a remote server computer containing a table establishing a correlation between a plurality of identification codes and status data being indicative of a legitimacy of usage of the block of digitally represented data represented by the associated identification code;
   searching said table and generating:
   i) status data in the event of a match between the identification code generated by the client and an identification code stored in said table;
   ii) algorithm data in the event of an inexact match between the identification code generated by the client and an identification code stored in said table for allowing the client computer to produce a new identification code for the block of digitally represneted information;
   iii) data indicative of a no match condition in the event of no match between the identification code generated by the client computer and an identification code stored in said table.

13. A method for auditing a block of digitally represented information to determine legitimate usage of the digitally represented information stored in a memory, said method comprising the steps of:

a) processing the block of digitally represented information to generate an identification code representative of the contents of the block of digitally represented information relative to other blocks of digital data also residing in said memory means;

b) transmitting said identification code to a remote computer that is capable of generating either one of status data and algorithm data;

c) processing status data received from the remote computer to generate information on said display means relative to a legitimacy of usage of the block of digitally represented information;

d) in response to algorithm data processing the block of digitally represented information according to an algorithm correlated to said algorithm data to generate a new identification code for transmission to the remote computer.

14. A machine readable storage medium for directing a client computer to perform an operation for establishing a legitimacy of usage of a block of digitally stored information residing in a memory associated with said client computer, said storage medium comprising;

means for directing said client computer to process the block of digitally stored information to generate an identification code representative of the contents of the block of digitally represented information relative to other blocks of digital data also residing in said memory;

means for directing said client computer to transmit said identification code to a remote server computer containing a table establishing a correlation between a plurality of identification codes and status data associated with each identification code, said status data being indicative of a legitimacy of usage of the block of digitally represented data represented by the associated identification code;

means for directing the server computer for searching said table for generating:

i) status data in the event of a match between the identification code generated by the client computer and an identification code stored in said table;

ii) algorithm data in the event of an inexact match between the identification code generated by the client computer and an identification code stored in said table for allowing the client computer to produce a new identification code for the block of digitally represented information;

iii) data indicative of a no match condition in the event of no match between the identification code generated by the client computer and an identification code stored in said table.

15. A machine readable storage medium for directing a client computer to audit a block of digitally represented information stored in a memory associated with said client computer to determine the legitimate usage of the digitally represented information, said machine readable medium comprising;

a) means for directing said client computer to generate an identification code representative of the contents of the block of digitally represented information relative to other blocks of digital data also residing in said memory means;

b) means for directing said client computer to transmit said identification code to a remote server computer that is capable of generating either one of status data and algorithm data;

c) means for directing said client computer to process status data received from the remote server computer to generate information on said display means relative to a legitimacy of usage of the block of digitally represented information;

d) means for directing said client computer to process the block of digitally represented information, in response to algorithm data received from the remote server computer, according to an algorithm correlated to said algorithm data to generate a new identification code for transmission to the remote server computer.

* * * * *